US012701413B2

(12) United States Patent
Perras et al.

(10) Patent No.: US 12,701,413 B2
(45) Date of Patent: Aug. 4, 2026

(54) END-TO-END AUTHENTICATION VIA A WTRU-TO-WTRU RELAY

(71) Applicant: InterDigital Patent Holdings, Inc., Wilmington, DE (US)

(72) Inventors: Michelle Perras, Montreal (CA); Alec Brusilovsky, Downingtown, PA (US); Samir Ferdi, Kirkland (CA); Xiaoyan Shi, Lake Oswego, OR (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 367 days.

(21) Appl. No.: 18/551,151

(22) PCT Filed: Apr. 4, 2022

(86) PCT No.: PCT/US2022/023319
§ 371 (c)(1),
(2) Date: Sep. 18, 2023

(87) PCT Pub. No.: WO2022/216612
PCT Pub. Date: Oct. 13, 2022

(65) Prior Publication Data
US 2024/0171972 A1      May 23, 2024

Related U.S. Application Data

(60) Provisional application No. 63/170,750, filed on Apr. 5, 2021.

(51) Int. Cl.
*H04W 12/06*          (2021.01)
*H04L 61/4511*          (2022.01)
(Continued)

(52) U.S. Cl.
CPC ......... *H04W 12/06* (2013.01); *H04L 61/4511* (2022.05); *H04W 12/08* (2013.01); *H04W 76/15* (2018.02)

(58) Field of Classification Search
CPC ..... H04W 12/06; H04W 76/15; H04W 12/08; H04L 61/4511
See application file for complete search history.

(56) References Cited

U.S. PATENT DOCUMENTS

| | | | |
|---|---|---|---|
| 11,388,656 B2 * | 7/2022 | Baek ...................... | H04W 48/16 |
| 12,317,073 B2 * | 5/2025 | Kim ...................... | H04W 76/14 |

(Continued)

OTHER PUBLICATIONS

3rd Generation Partnership Project, 3rd Generation Partnership Project, Study on system enhancement for Proximity based Services (ProSe) in the 5G System (5GS) (Release 17), Technical Specification Group Services and System Aspects; 3GPP TR 23.752 v1.1.0, 183 pages.

(Continued)

*Primary Examiner* — Khawar Iqbal
(74) *Attorney, Agent, or Firm* — Flaster Greenberg P.C.

(57) ABSTRACT

A wireless transmit/receive unit (WTRU) may function as a relay between other WTRUs. The relay WTRU may receive a domain name system (DNS) query request from a first WTRU for the internet protocol (IP) address of a second WTRU. The DNS query request may comprise the first WTRU's authentication container. The relay WTRU may: send a first authentication request comprising the first WTRU's authentication container to the second WTRU, receive a first authentication response from the second WTRU indicating successful authentication of the first WTRU and comprising the second WTRU's authentication container, send a second authentication request to the first WTRU comprising the second WTRU's authentication container, receive a second authentication response from the first WTRU indicating successful authentication of the second WTRU, and based on successful authentication of the first and second WTRUs, send a DNS response comprising the IP address of the second WTRU to the first WTRU.

10 Claims, 12 Drawing Sheets

(51) Int. Cl.
H04W 12/08 (2021.01)
H04W 76/15 (2018.01)

(56) References Cited

U.S. PATENT DOCUMENTS

| | | | | |
|---|---|---|---|---|
| 12,490,082 B2 * | 12/2025 | Kuo | .................. | H04W 28/0252 |
| 2007/0253377 A1 * | 11/2007 | Janneteau | ........... | H04L 61/4511 |
| | | | | 370/338 |
| 2020/0314061 A1 * | 10/2020 | Uchikawa | ............... | H04L 61/30 |
| 2021/0409263 A1 * | 12/2021 | Kuo | ...................... | H04W 76/34 |
| 2021/0410215 A1 * | 12/2021 | Kuo | ...................... | H04W 76/14 |
| 2022/0210204 A1 * | 6/2022 | Lee | .......................... | H04L 65/80 |
| 2022/0295375 A1 * | 9/2022 | Wang | ................... | H04W 76/12 |
| 2022/0361267 A1 * | 11/2022 | Wang | ................... | H04W 76/14 |
| 2023/0179565 A1 * | 6/2023 | Peterson | ............. | H04L 61/4511 |
| | | | | 709/245 |
| 2023/0209618 A1 * | 6/2023 | Fu | ....................... | H04L 61/5092 |
| | | | | 370/329 |
| 2023/0422325 A1 * | 12/2023 | Tenny | .................. | H04W 76/14 |

OTHER PUBLICATIONS

3rd Generation Partnership Project, Study on system enhancement for Proximity based Services (ProSe) in the 5G System (5GS) (Release 17), Technical Specification Group Services and System Aspects; 3GPP TR 23.752 v17.0.0, Mar. 2021, 183 pages.

3rd Generation Partnership Project, "Solution for privacy handling with Layer-3 based UE-to-UE Relay", InterDigital, 3GPP TSG-SA3 Meeting #1021-e, S3-210824, Jan. 18-29, 2021, 4 pages.

3rd Generation Partnership Project, "KI#4, Sol#9: Update on extended link establishment for Layer 2 UE-UE Relay", Huawei, HiSilicon, 3GPP TSG-WG SA2 Meeting #142E e-meeting, S2-2008840, Elbonia, Nov. 16-20, 2020, 6 pages.

3rd Generation Partnership Project, "New Solution for privacy with Adaptation Layer and Layer-2 based UE-to-UE Relay", InterDigital, 3GPP TSG-SA3 Meeting #102Bis-e, e-meeting, S3-210820, Mar. 1-5, 2021, 4 pages.

* cited by examiner

END-TO-END AUTHENTICATION VIA A WTRU-TO-WTRU RELAY

CROSS-REFERENCE TO RELATED APPLICATIONS

This application is the 371 National Stage of International Application No. PCT/US2022/023319, filed Apr. 4, 2022, which claims the benefit of U.S. Provisional Patent Application No. 63/170,750, filed Apr. 5, 2021, the entirety of which is incorporated by reference herein.

FIELD OF THE INVENTION

The present disclosure is generally directed to the fields of communications, software, and encoding, including, for example, methods, architectures, apparatuses, and systems directed to a relay wireless transmit receive unit (WTRU), also referred to as a UE (user equipment) interchangeably herein.

BACKGROUND

Advancements in telecommunications are making it possible for more and more devices, such as wireless transmit receive units (WTRUs), to communication with each other. At times, however, one device may not be able to communicate directly with another device.

SUMMARY

A relay WTRU, also referred to herein as a UE (user equipment) may function as a relay between end-to-end (E2E) WTRUs. The relay WTRU may effectuate E2E authentication of the E2E WTRUs prior to establishing communications between the E2E WTRUs. For example, respective PC5 unicast links may be established between the relay WTRU and a first WTRU and between the relay WTRU and a second WTRU. Establishment of a PC5 unicast link may be initiated by the relay WTRU, an E2E WTRU, or a combination thereof. The relay WTRU may receive a domain name system (DNS) query request from the first WTRU for the internet protocol (IP) address of the second WTRU. The DNS query request may be received by the relay WTRU via the PC5 unicast link established between the first WTRU and the relay WTRU. The DNS query request may comprise an authentication container for the first WTRU. Upon receipt of the DNS query request from the first WTRU, the relay WTRU may send to the second WTRU, via its respective PC5 unicast link, an E2E authentication request comprising the authentication container for the first WTRU. In response, the relay WTRU may receive from the second WTRU, via its respective PC5 unicast link, an E2E authentication response comprising an indication of successful authentication of the first WTRU by the second WTRU and an authentication container for the second WTRU. The relay WTRU then may send, to the first WTRU via its respective PC5 unicast link, an E2E authentication request comprising the authentication container for the second WTRU. In response, the relay WTRU may receive, from the first WTRU via its respective PC5 unicast link, an E2E authentication response that indicates successful authentication of the second WTRU by the first WTRU. Based on successful authentication of the first WTRU by the second WTRU and the second WTRU by the first WTRU, the relay WTRU may send, to the first WTRU via its respective PC5 unicast link, a DNS response comprising the IP address of the second WTRU. As such, the relay WTRU has executed and enforced E2E authentication between the first and second WTRU prior to E2E communications.

As another example, from a first WTRU's perspective, the first WTRU may initiate E2E authentication with a second WTRU, via a relay WTRU. The first WTRU may establish a PC5 unicast link with the relay WTRU. The first WTRU may send a PC5 authentication request for the second WTRU via the relay WTRU. The first WTRU may receive a PC5 authentication response from the second WTRU via the relay WTRU. Based on the received PC5 authentication response from the second WTRU, the first WTRU may authenticate the second WTRU. Upon successful authentication of the second WTRU by the first WTRU, the first WTRU may send a DNS query request to the relay WTRU for the IP address of the second WTRU.

In another example in which a relay WTRU may effectuate E2E authentication of E2E WTRUs prior to establishing communications between the E2E WTRUs, respective PC5 unicast links may be established between the relay WTRU and first and second WTRUs. The relay WTRU may request from the second WTRU, via its respective PC5 unicast link, an expected authentication challenge response that the second WTRU expects from the first WTRU. The relay WTRU may receive an expected authentication challenge response, via its respective PC5 unicast link, from the second WTRU. The relay WTRU may provide an authentication challenge to the first WTRU, via its respective PC5 unicast link. In response, the relay WTRU may receive, via its respective PC5 unicast link, an authentication challenge response from the first WTRU. The relay WTRU may compare the authentication challenge response received from the first WTRU with the expected authentication challenge response previously received from the second WTRU. Upon the comparison resulting in a match, the relay WTRU may request from the first WTRU, via its respective PC5 unicast link, an expected authentication challenge response that the first WTRU expects from the second WTRU. The relay WTRU may receive an expected authentication challenge response, via its respective PC5 unicast link, from the first WTRU. The relay WTRU may provide an authentication challenge to the second WTRU, via its respective PC5 unicast link. In response, the relay WTRU may receive, via its respective PC5 unicast link, an authentication challenge response from the second WTRU. The relay WTRU may compare the authentication challenge response received from the second WTRU with the expected authentication challenge response previously received from the first WTRU. Upon the comparison resulting in a match, the relay WTRU may effectuate communications between the first WTRU and the second WTRU.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Like reference numerals ("ref." or "refs.") in the Figures indicate like elements.

DETAILED DESCRIPTION

The present disclosure is generally directed to the fields of communications, software, and encoding, including, for example, methods, architectures, apparatuses, and systems directed to a relay wireless transmit/receive unit (WTRU), a layer 2 (L2) WTRU-to-WTRU relay, a proximity services (ProSe) 5G WTRU-to-WTRU relay, and Internet Protocol Security (IPsec).

Example Networks for Implementation of the Invention

Figure 1A:
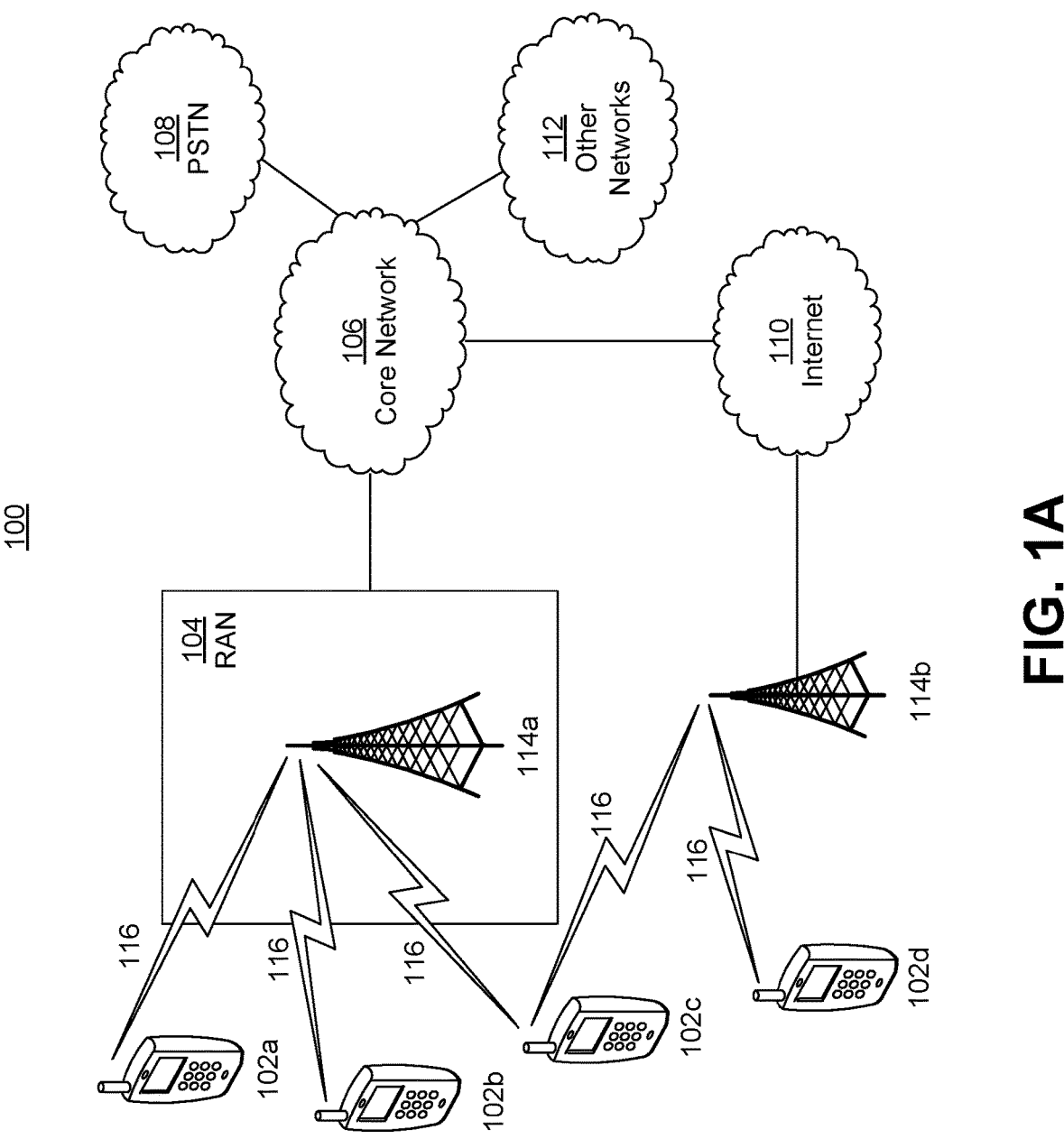
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment, By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRU's 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RAN's that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
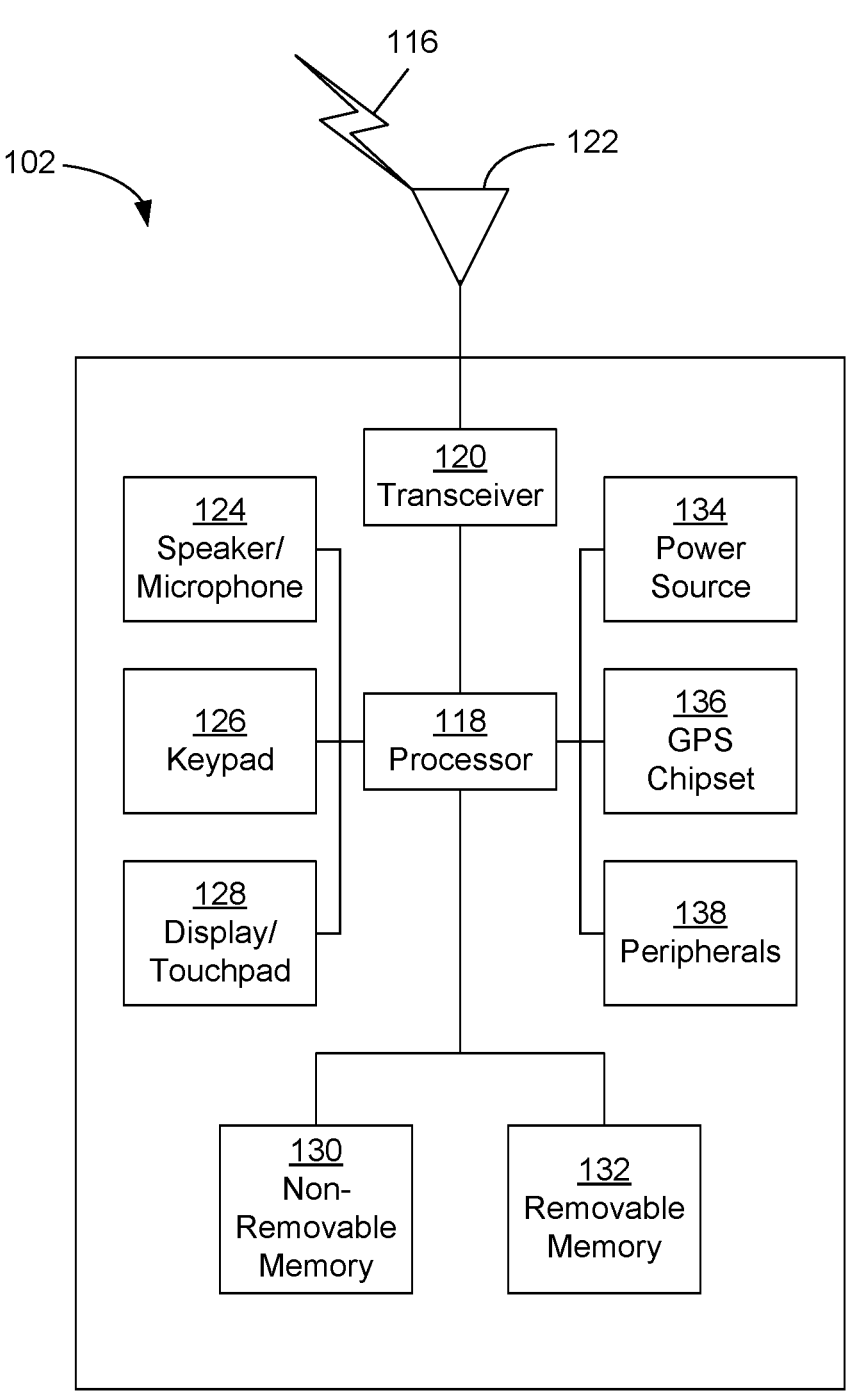
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
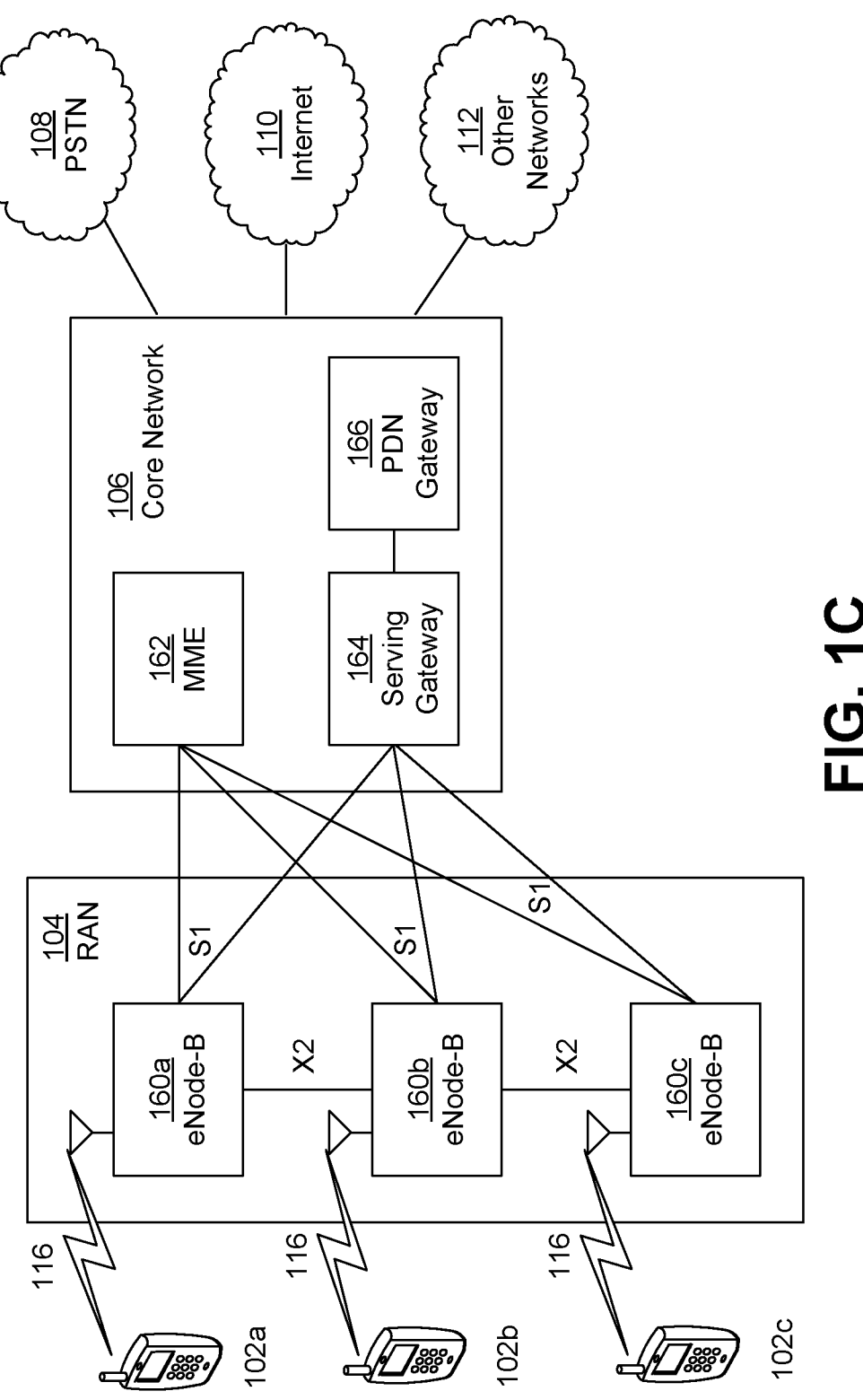
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11 e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz, channel with an adjacent or non-adjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams, Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHZ modes of operation are supported by 802.11af and 802.11ah. The channel operating bandwidths, and carriers, are reduced in 802.11af and 802.11ah relative to those used in 802.11n, and 802.11ac, 802.11 af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area, MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
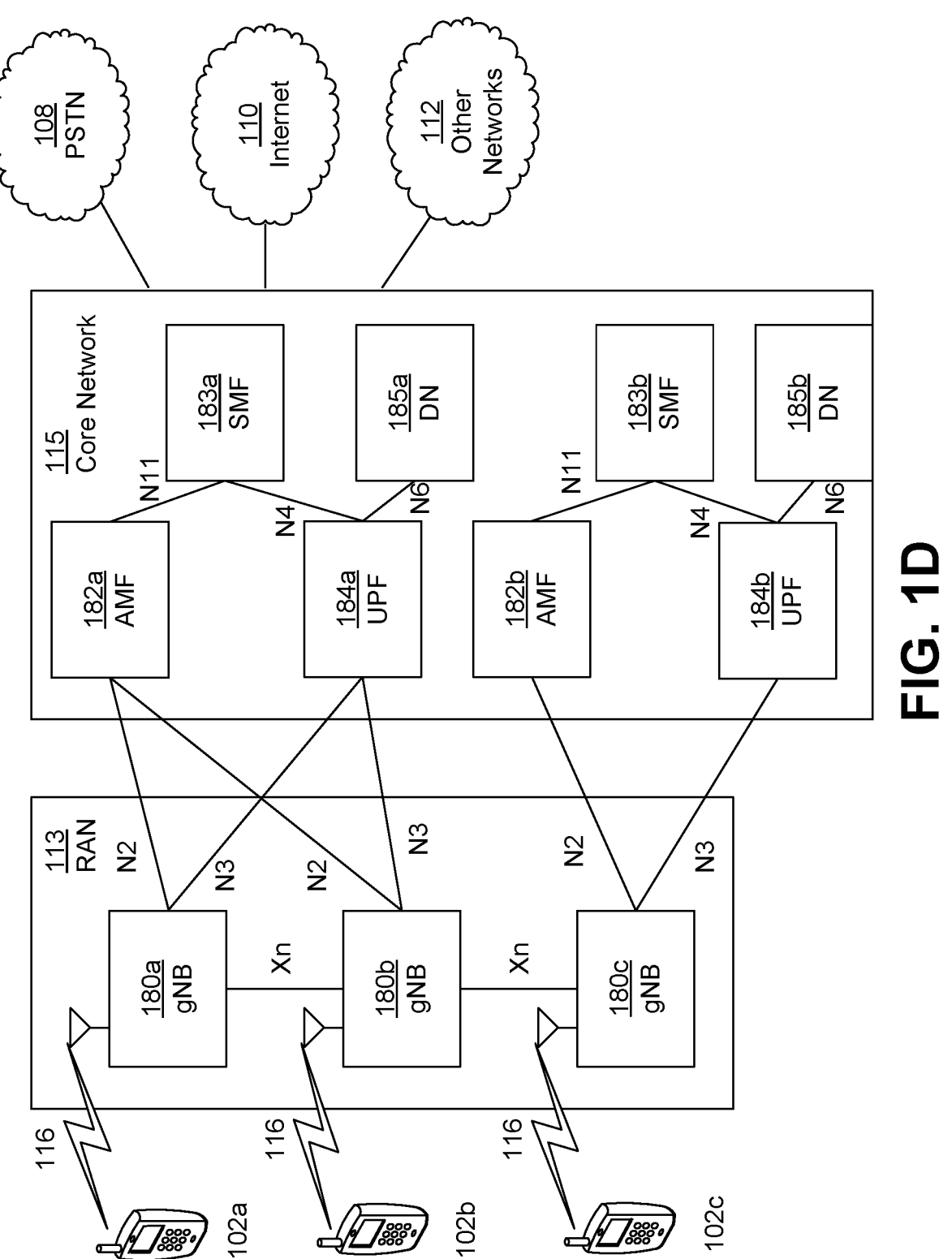
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

IP Traffic Considerations When Utilizing A Relay WTRU

Figure 2:
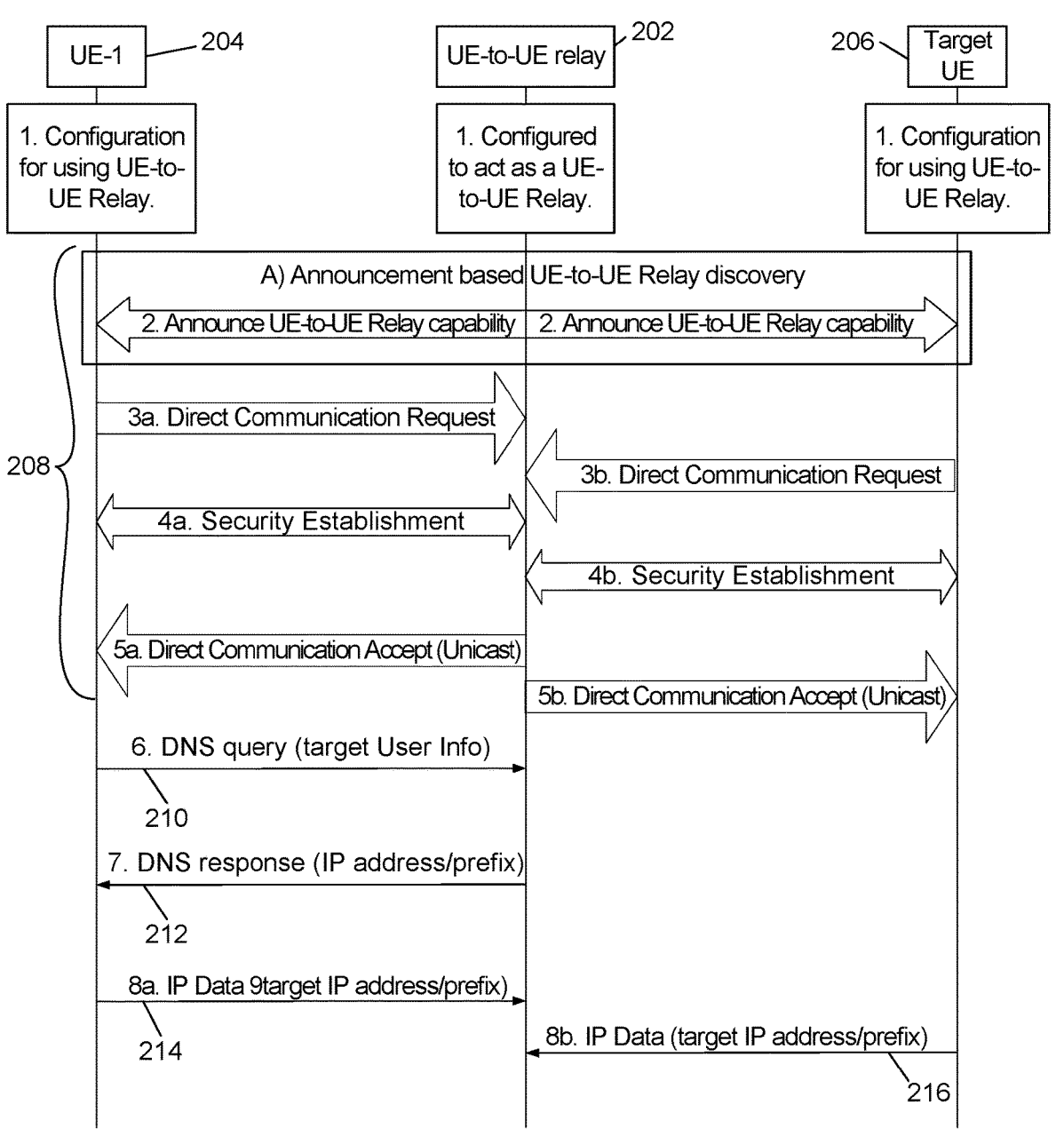
FIG. 2 is a diagram illustrating a WTRU-to-WTRU relay using IP routing.

FIG. 2 is an example diagram illustrating a relay WTRU-to-WTRU using IP routing. As described herein, a relay WTRU (also referred to herein as a WTRU relay), such as WTRU 202, may interchangeably be referred to as a WTRU-to-WTRU relay, a layer 3 (L3) WTRU-to-WTRU relay, a proximity services (ProSe) $5^{th}$ Generation (5G) WTRU-to-WTRU relay, UE relay, and a relay UE.

Relay WTRU 202 may perform IP traffic routing. Relay WTRU 202 may facilitate communications between WTRU 204 and WTRU 206 (e.g., refs. 208, 210, 212, 214, 216). Each of WTRU 204 and WTRU 206 may be considered a source WTRU, a target WTRU, a remote WTRU, or the like, or any appropriate combination thereof. In an example embodiment, WTRU 202 may be a L3 WTRU-to-WTRU relay (e.g., a ProSe 5G WTRU-to-WTRU relay), and a unicast layer 2 (L2) link (e.g., a PC5 unicast link) may be established between relay WTRU 202 and WTRU 204 (e.g., ref. 208). Similarly, a unicast layer 2 (L2) link (e.g., a PC5 unicast link) may be established between relay WTRU 202 and WTRU 206 (e.g., ref. 208). In a case of establishing a unicast L2 link (e.g., a unicast L2 link establishment procedure), WTRU relay 202 may allocate an IP address/prefix to a WTRU (e.g., WTRU 204, WTRU 206) and store, into its DNS entries, an association of a WTRU's user information and allocated IP address/prefix. In such a case, WTRU Relay 202 may perform functions similar to a DNS server (e.g., ref. 208).

A WTRU (e.g., WTRU 204, WTRU 206) may want to communicate with another WTRU (e.g., WTRU 204, WTRU 206), and/or want to discover a ProSe service via a WTRU relay (e.g., WTRU relay 202). In various example embodiments, WTRU 204 may send a DNS query to WTRU Relay 202 over a unicast link (e.g., a PC5 unicast link) (ref. 210). The DNS query may comprise a request for a target WTRU, such as, for example, WTRU 206 (for example, based on the target WTRU's user information), the ProSe Service, or any appropriate combination thereof. In response to the DNS query, WTRU relay 202 may send information indicating the IP address/prefix for the target WTRU user information, or for the ProSe Service, or a combination thereof (ref. 212). WTRU 204 may send IP data, or non-IP data encapsulated in IP, to WTRU 206 via the unicast L2 link to the WTRU relay (e.g., WTRU relay 202) that returned the IP address/prefix of the target WTRU, such as WTRU 206 for example (ref. 214). Further, in such case, WTRU relay 202 may act as an IP router, and forward the packets to the corresponding unicast L2 link towards the target WTRU (e.g., WTRU 206), wherein each of the unicast L2 links may be treated as an IP interface (ref. 216).

Internet Protocol Security (IPsec) is a secure network protocol suite which may be used to route IP traffic. IPsec may be used for authenticating and encrypting packets of data (e.g., IP traffic), for example, to provide secure, and confidentiality-protected, communication between two endpoints over an IP network. IPSec may be used for authentication, traffic encryption for end to end (E2E) packets, or a combination thereof. IPsec may be handled at the application layer. An IPsec tunnel may be established between E2E peer WTRUs via the exchange of IP traffic between the E2E peer WTRUs. A relay WTRU may not be aware of IPsec tunnel establishment, and thus from the perspective of the relay WTRU, the IP traffic associated with the IPsec tunnel is just IP traffic.

Figure 3:
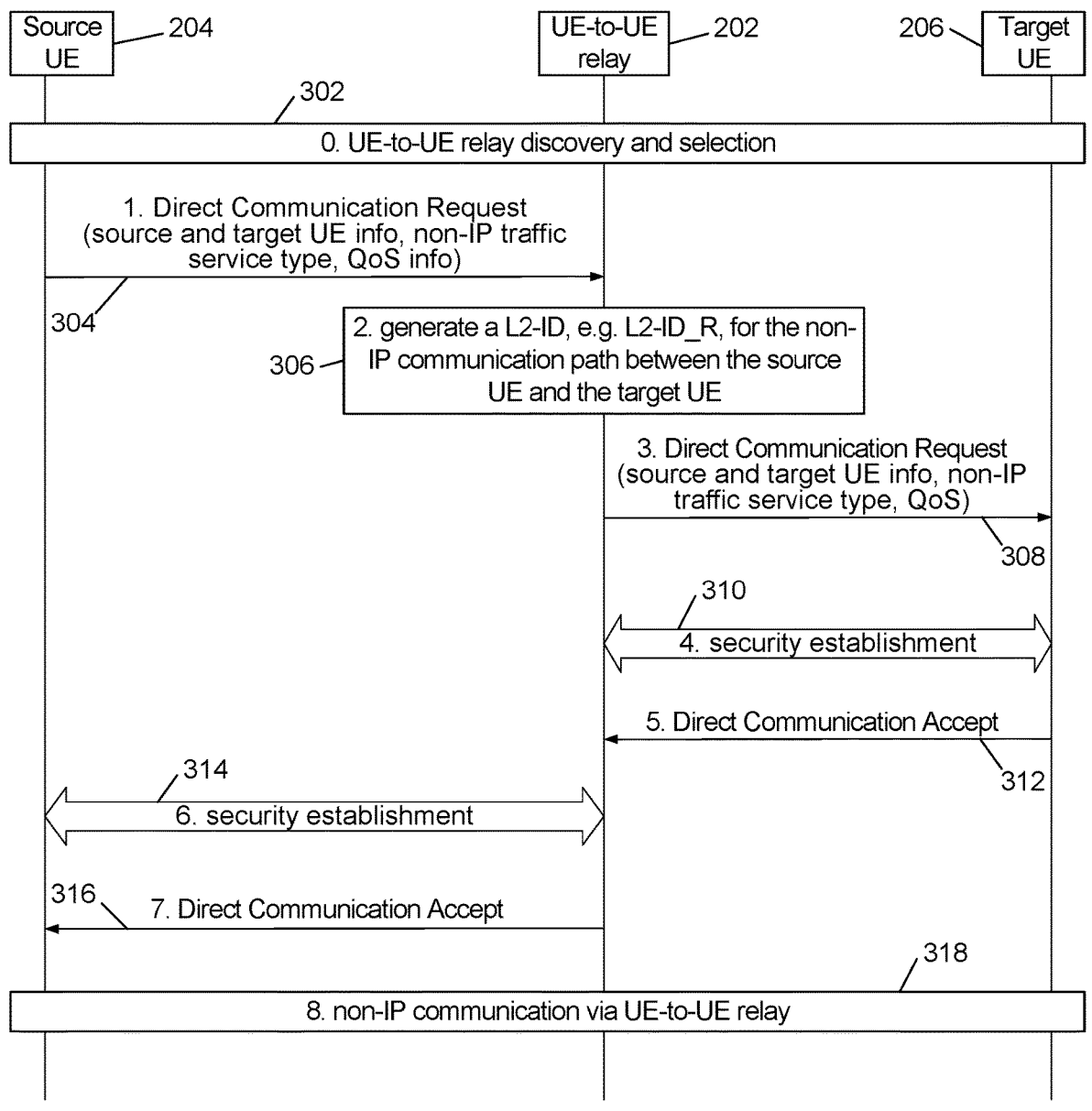
FIG. 3 is a diagram illustrating an end-to-end link establishment procedure for non-IP traffic via a layer 3 (L3) WTRU-to-WTRU relay.

A WTRU may be configured to consider whether a service is for non-IP traffic when establishing a unicast link. FIG. 3 is a diagram illustrating an example end-to-end link establishment procedure for non-IP traffic via a WTRU relay (e.g., WTRU relay 202). As described herein, non-IP traffic refers to traffic that does not have an IP header. A relay WTRU (e.g., WTRU relay 202), may facilitate non-IP traffic routing (refs. 302, 304, 306, 308, 310, 312, 314, 316, 318). A WTRU may want to communicate with another WTRU and/or want to discover a ProSe service available via another WTRU (ref. 302). In an example embodiment, a source WTRU (e.g., WTRU 204) may establish a PC5 link with a WTRU relay (e.g., WTRU 202) for non-IP traffic, with respect to a target WTRU (e.g., WTRU 206). In example embodiments, non-IP traffic sent from a source WTRU to different target WTRUs may not share the same PC5 link between the source WTRU and the WTRU Relay. Accordingly, for each pair of source and target WTRUs, the WTRU relay may assign itself a Layer 2 identifier (L2 ID), denoted as L2-ID_R, which may be used in: (1) the non-IP PC5 link to the source WTRU, and (2) the non-IP PC5 link to the target WTRU (refs. 304, 306, 308). The WTRU relay may maintain a mapping between an L2-ID_R and a pair of source and target WTRUs.

For end-to-end security, IPsec may not be used in a case where end-to-end peer WTRUS do not exchange IP traffic. In such a case, an application may implement end-to-end authentication and security for non-IP traffic. It is noted that the security establishment, for example, the End-to-end link establishment procedure for non-IP traffic as shown in FIG. 3, at refs. 310, 312, is related to the PC5 unicast links established between the WTRU relay and first (e.g., source) and second (e.g., target) WTRU's (e.g., WTRU 204, WTRU 206). In such a case, communication between a first WTRU (e.g., WTRU 204) and a relay WTRU (e.g., WTRU 202) may be secured (e.g., integrity and/or confidentiality is provided and/or protected), and the same may be the case for the PC5 link between the relay WTRU (e.g., WTRU 202) and a second WTRU (e.g., WTRU 206) (ref. 318). However, this may not provide end-to-end security, or may not establish end-to-end security for the first and second WTRUs (e.g., WTRU 204, WTRU 206), for non-IP traffic.

A WTRU may be configured to address E2E mutual authentication considerations. A relay WTRU may support relaying IP traffic, non-IP traffic, or a combination thereof, between two end-to-end peer WTRUs using two respective PC5 unicast links. However, in view of the IP traffic considerations and non-IP traffic considerations discussed above with respect FIG. 2 and FIG. 3, end-to-end authentication and security may not be provided. As noted above, IPsec is used for end-to-end authentication and security protection of IP traffic. That is, IPsec is handled at the application layer, and thus, uses E2E communication, for example, to allow for IPsec establishment. In a case of IPsec, for example, as applied to the cases discussed above, E2E WTRUs may send traffic prior to E2E peer WTRUs being successfully authenticated. However, in a general case, authentication is recommended to precede actual communication. Thus, the establishment of a secure communication tunnel between two unauthenticated endpoints makes sense only in a limited set of use cases, such as, for example, when mutual authentication is deemed unnecessary or prohibited by security policy or regulations (e.g., similar to unauthenticated emergency calling support).

In the limited set of use cases in which IPsec may not be used because the traffic is not IP-based (e.g., non-IP traffic), it may up to the application to implement end-to-end authentication and security for non-IP traffic. Further, E2E WTRUs may send non-IP traffic prior to E2E peer WTRUs being successfully authenticated. In view of the IP-traffic, non-IP traffic, and IPsec considerations discussed above, and for example, as depicted in FIG. 2 and FIG. 3, provided below are mechanisms for executing E2E mutual authentication prior to allowing E2E communications for both IP traffic and non-IP traffic, and mechanisms for enforcing E2E mutual authentication prior to allowing E2E communications, for both IP traffic and non-IP traffic.

In various example embodiments, E2E authentication may be provided by a relay WTRU (e.g., L3 WTRU-to-WTRU relay, ProSe 5G WTRU-to-WTRU relay), for IP traffic, non-IP traffic, or any appropriate combination thereof. As described herein, any of a WTRU's ProSe application layer ID, a WTRU's ProSe user information, a WTRU's user information, or a combination thereof, may be used interchangeably, and any of an IP address and an IP prefix may be used interchangeably. Also, as described herein, the term "user information" may be used interchangeably with the term "application layer ID." An application layer ID is an identifier identifying a WTRU within the context of a specific application. According to embodiments, any of the below discussed features, operations, procedures, processes, description, entities, architectures, signaling, methods, information, etc., may provide E2E authentication enforced by a relay WTRU for IP traffic, non-IP traffic, or a combination thereof.

In various example embodiments, a relay WTRU (e.g., an L3 and/or ProSe 5G WTRU-to-WTRU relay) may provide E2E authentication of IP traffic. According to embodiments, in a case of such a relay WTRU, any of the following operations may be performed. According to embodiments, PC5 unicast links may be established, for example, between a first WTRU (also referred to as UE1) and a relay WTRU, and between a second WTRU (also referred to as UE2) and the relay WTRU. According to embodiments, during PC5 link establishment and prior to E2E communication, any of the first or second WTRUs may indicate (e.g., request, specify, commend, etc.) that E2E authentication is used. According to embodiments, during PC5 link establishment, an IP address may not be shared before E2E authentication has occurred (e.g., is completed, is successfully run, etc.).

According to example embodiments, the first WTRU may send a DNS query message to the relay WTRU. The DNS query message may include any of second WTRU user information, first WTRU user information, and a first WTRU authentication container, which may be interchangeably referred to as any of a container and a WTRU/UE container. The relay WTRU may determine whether E2E authentication is required for obtaining the second WTRU's IP address. If E2E authentication is to be utilized, the relay WTRU may trigger E2E authentication, for example, by sending a PC5 authentication request message to the second WTRU, the PC5 authentication request message including the first WTRU authentication container.

According to example embodiments, the second WTRU may validate the first WTRU authentication container and may reply to the relay WTRU with a PC5 authentication response message including a second WTRU container. An "authentication complete" indication may be included in the PC5 authentication response message, for example, if the authentication procedure is completed. The relay WTRU may keep track of (e.g., may be informed of, may register/ store/note/etc.) an authentication completion and the relay WTRU may send a PC5 authentication request message to the first WTRU. The request message may include the second WTRU container.

According to example embodiments, the first WTRU may validate the second WTRU authentication container, and the first WTRU may send (e.g., may reply with) a PC5 authentication response message including an "authentication complete" indication. The relay WTRU may keep track of successful authentication between first WTRU user information and second WTRU user information. The relay WTRU may reply to the DNS Query message by sending a DNS Response message including the second WTRU's IP address, for example, if the mutual authentication between the first and second WTRUs is successful, for example, based on the "authentication complete" indication. In view of the above, according to embodiments, a first WTRU may not communicate with the second WTRU without knowing the second WTRU's IP address. For example, by blocking a DNS query reply message to the first WTRU, the relay WTRU may provide (e.g., enforce) mutual authentication before communication.

According to example embodiments, there may be a case of a mutual authentication procedure between WTRUs which may be performed after the DNS message exchange between the first WTRU and the relay WTRU. In such a case, any of the following operations, features, and embodiments may occur (e.g., as alternatives and/or additions to embodiments discussed herein). The relay WTRU may send a DNS response message (e.g., a reject message) to the first WTRU with an indication that authentication is needed to obtain a WTRU's (e.g., a second WTRU's, a target WTRU's, a UE2's) IP address. The second WTRU's IP address may not be included in the DNS response message (e.g., a reject message). According to embodiments, the first WTRU may initiate authentication with a second WTRU by sending, to the relay WTRU, a PC5 authentication request message for the second WTRU. The PC5 authentication request message may include the second WTRU's user information and the first WTRU's authentication container. The relay WTRU may forward authentication messages between the first WTRU and the second WTRU, and the relay WTRU may be informed by any of the first WTRU and the second WTRU of authentication completion, for example, as described above. According to embodiments in which mutual authentication is successful, the relay WTRU may keep track (e.g., store, map, etc.) that the first WTRU is authorized to obtain the second WTRU's IP address. The relay WTRU may mark the first WTRU as authorized for discovering the IP address of the second WTRU. In a case of a successful mutual authentication procedure, the first WTRU may send a DNS query to obtain the IP address of the second WTRU. The relay WTRU, before sending the IP address of the second WTRU in a DNS response, may determine (e.g., check) whether the first WTRU is authorized for discovering the second WTRU's IP address.

According to example embodiments, depending upon the authentication method used, there may be multiple authentication messages exchanged between the first and second WTRUs via the relay WTRU (e.g., as discussed above). The first and second WTRU's may generate a shared key and shared key ID, for example, as part of the procedure for mutual authentication via the relay WTRU. According to embodiments, the first and second WTRUs subsequently may use the shared key and shared key ID to secure the Application/IP layer communications (e.g., using IPSec PSK or TLS PSK).

According to example embodiments, any of the following operations may be performed as an alternative and/or an addition to embodiments discussed above: (1) a second WTRU's IP address may be provided by the second WTRU via a container for the second WTRU: (2) the relay WTRU may not perform E2E authentication status tracking, for example, in a case where the relay doesn't need to determine whether to provide an IP address (e.g., of the second WTRU) to the first WTRU: (3) the first WTRU may not use an additional DNS procedure, for example, to obtain the second WTRU's IP address from the relay WTRU.

According to example embodiments, there may be a case where the first WTRU sends a DNS query specifying an application ID, instead of target WTRU user information. According to embodiments, in such case, the relay WTRU may verify whether E2E authentication is needed for the application ID, and in a case where such is needed, the relay WTRU may respond with a DNS response message including a list of target WTRUs user information and an indication that E2E authentication is used.

According to example embodiments, a relay WTRU may perform operations of an authenticator. The relay WTRU may act as an authenticator, for example, on behalf of any of the first and second WTRUs, for mutually authenticating the peer WTRUs. In such a case, there may be a (e.g., needed, required, preexisting, pre-established, etc.) bilateral trust between the relay WTRU and the first WTRU and between the relay WTRU and the second WTRU, and in such a case, there may not be trust between the first and second WTRUs.

According to example embodiments, a relay WTRU may facilitate generation of an expected authentication response (EAR), such as, for example, EAR-UE1 and/or EAR-UE2, at/by the first and second WTRUs (e.g., UE1 and UE2). A relay WTRU may store any of EAR-UE1 and/or EAR-UE2, and may facilitate any of the first and second WTRUs in: (1) producing a computed authentication response (CAR), such as, for example, CAR-UE1 and/or CAR-UE2, and (2) communicating any of CAR-UE1 and CAR-UE2 to the relay WTRU. Upon receiving any of CAR-UE1 and CAR-UE2, the relay WTRU may compare CAR-UE1 with EAR-UE1, for example, to authenticate the first WTRU to the second WTRU on behalf of the second WTRU.

According to example embodiments, the relay WTRU may compare CAR-UE2 with EAR-UE2 to authenticate the second WTRU to the first WTRU on behalf of the first WTRU. According to embodiments, in a case where both matches are successful, the relay WTRU has facilitated mutual authentication between the first and second WTRUs. For example, in view of the operations and features discussed herein, a relay WTRU may enforce a policy of requiring mutual authentication before communication, for example, by blocking a DNS response message to the first WTRU. According to embodiments, (e.g., per policy) in a case of any of successful mutual authentication or one way authentication, the relay WTRU may release (e.g., send, relay, forward, etc.) the DNS response message and may allow the first WTRU to communicate (e.g., start communicating) with the second WTRU.

A WTRU may be configured to authenticate E2E non-IP traffic, According to example embodiments, a relay WTRU (e.g., an L3 and/or ProSe 5G WTRU-to-WTRU relay) may provide E2E authentication of/for non-IP traffic. In various example embodiments, in a case of such a relay WTRU, any of the following operations may be performed. A PC5 link may be established for non-IP traffic, for example, between a first WTRU and the relay WTRU. For example, during PC5 link establishment, the first WTRU may indicate (e.g., request, specify, etc.) that E2E authentication is performed prior to E2E communication, and further, the first WTRU may indicate/specify its authentication container (e.g., UE1 authentication container). The relay WTRU may send a direct communication request (DCR) message to a second WTRU. The DCR message may include information indicating that E2E authentication is used. The second WTRU may store information indicating (e.g., may keep track) that E2E authentication is required and that a direct communication accept (DCA) message may not be sent before completing successful E2E authentication.

According to example embodiments, the relay WTRU may trigger an E2E authentication procedure, for example, after a successful PC5 unicast link security establishment. The relay WTRU may send a PC5 authentication request message to the second WTRU. The PC5 authentication request message may include the first WTRU container. According to embodiments, the second WTRU may validate the first WTRU's authentication container, and the second WTRU may send (e.g., reply with): (1) a PC5 authentication response message including the second WTRU's authentication container, (2) information indicating that authentication is complete, e.g., if the authentication procedure is completed, or a combination thereof. According to embodiments, the relay WTRU may store information indicating (e.g., keep track of) the authentication completion from the second WTRU. The relay WTRU may send a PC5 authentication request message to the first WTRU. The PC5 authentication request message may include the second WTRU container. The second WTRU may send a DCA message, for example, in order to complete (e.g., to indicate completion of) the PC5 link establishment procedure.

According to example embodiments, the relay WTRU may receive DCA from the second WTRU, while waiting for successful E2E authentication procedure completion before sending a DCA to the first WTRU. The first WTRU may validate the second WTRU authentication container, and the first WTRU may send (e.g., reply with) a PC5 authentication response message including an authentication complete indication. The relay WTRU may send a DCA message to the first WTRU. The first and second WTRUs may generate a shared key and shared key ID, for example, as part of the above discussed mutual authentication via relay WTRU procedure. The first and second WTRUs subsequently may use the shared key and shared key ID to secure any of the application layer and IP layer communications (e.g., using IPSec PSK or TLS PSK).

According to example embodiments, a WTRU may be provisioned with any of application IDs and related security policies, A parameter (e.g., new, added, etc.) for end-to-end authentication may be used to indicate whether end-to-end authentication is used, for example, before allowing an exchange of traffic (e.g., IP, non-IP, a combination thereof, etc.). The E2E authentication policy provisioned on the WTRU may be associated to/with an application ID.

Figure 4:
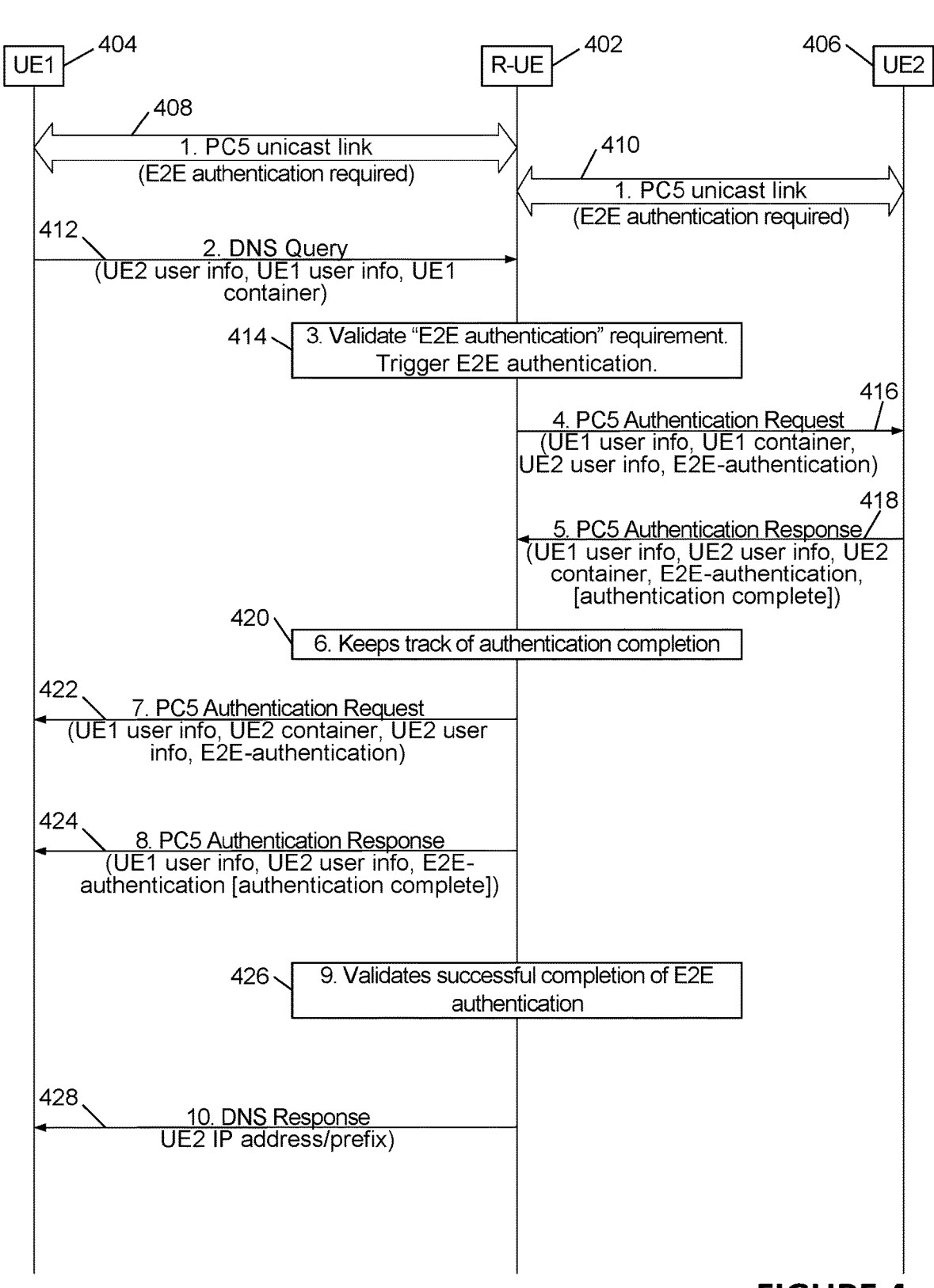
FIG. 4 is a diagram illustrating IP traffic end-to-end authentication for an L3 WTRU-to-WTRU relay, according to embodiments.

A WTRU may be configured to authenticate E2E IP traffic. FIG. 4 is a diagram illustrating IP traffic end-to-end authentication for a WTRU relay, according to embodiments. As described herein, a relay WTRU (also referred to herein as a WTRU relay or a relay WTRU), such as WTRU 402, may interchangeably be referred to as a WTRU-to-WTRU relay, a layer 3 (L3) WTRU-to-WTRU relay, and a proximity services (ProSe) 5th Generation (5G) WTRU-to-WTRU relay. In example embodiments, relay WTRU 402 may be a WTRU comparable to WTRU 102 depicted in FIGS. 1A through 1D, and described above.

Embodiments may enable E2E authentication enforcement at/by a relay WTRU. Referring to FIG. 4, there may be a procedure (e.g., signaling/information exchange, method, flow: etc.) for end-to-end (E2E) authentication including (e.g., involving) WTRU relay 402 for IP traffic, which may include a DNS query with an authentication container. E2E authentication enforcement for IP traffic performed by relay WTRU 402 may include any of the following. A PC5 unicast link may be established between a first WTRU (e.g., WTRU 404) and a relay WTRU (e.g., WTRU 402) (ref. 408), A PC5 unicast link may be established between a second WTRU (e.g., WTRU 406) and the relay WTRU (e.g., WTRU 402) (ref. 410). During PC5 link establishment (refs. 408, 410), any of the first and second WTRUs (e.g., WTRU 402, WTRU 406) may indicate (e.g., send information that indicates, specifies, informs, etc.) that E2E authentication is required prior to E2E communication. In such a case, an IP address may not be shared before E2E authentication is successfully accomplished. Relay WTRU 402 may store (e.g., save) this E2E authentication requirement, for example, as a policy associated with/to any of the first and second WTRU's (e.g., WTRU 404, WTRU 406) user information and/or application ID.

In an example embodiment, first WTRU 404 may send a DNS query to relay WTRU 402 (ref. 412). The DNS query may include any of second WTRU 406's user information, first WTRU 404's user information, first WTRU 404's authentication container, or any appropriate combination thereof. In a case where first WTRU 404 doesn't provide its authentication container in the DNS query message, and relay WTRU 402 determines that E2E authentication is required, relay WTRU 402 may request first WTRU 404 to provide first WTRU 404's authentication container, for example, by sending a DNS reject message with information indicating that E2E authentication is required. In such a case, first WTRU 404 may send a new DNS query message including first WTRU 404's container. In an example embodiment, relay WTRU 402 may determine (e.g., verify) the E2E authentication policy associated with second WTRU 406 user information and first WTRU 404 user information. In a case where E2E authentication is used for one of WTRU 404 or WTRU 406, relay WTRU 402 may trigger E2E authentication (ref. 414).

Relay WTRU 402 may send a PC5 authentication request message to second WTRU 406 (ref. 416). The PC5 authentication request message may include first WTRU 404's authentication container, first WTRU 404 user information, second WTRU 406 user information, an indication that the request message is for E2E authentication, or any appropriate combination thereof. E2E authentication indication indicates, to first WTRU 404, second WTRU 406, relay WTRU 402, that the authentication message is to be applied for E2E communication (e.g., between the WTRU 404 and WTRU 406), and not applied to the PC5 unicast link (e.g., between an endpoint WTRU and a relay WTRU) onto which the authentication message is sent.

Second WTRU 406 may validate first WTRU 404's authentication container, and second WTRU 406 may send (e.g., replies with) a PC5 authentication response message including second WTRU 406's authentication container, second WTRU 406 user information, first WTRU 404 user information, information indicating E2E authentication, or any appropriate combination thereof (ref. 418). Information indicating that authentication is complete (e.g., an authentication complete indication) may be included, in the response message, in a case where the authentication procedure is completed (ref. 418). In an example embodiment, authentication may include sending multiple authentication requests and/or response messages. In such a case, any of the WTRU 404 and WTRU 406 may include an authentication complete indication in the last PC5 authentication response message, for example, so that relay WTRU 402 knows that the E2E authentication is completed.

WTRU 402 may store information indicating (e.g., keep track of) authentication completion, for example, according to the authentication completion indication (ref. 420). If authentication fails, a PC5 authentication reject or failure message may be sent to/from relay WTRU 402.

Relay WTRU 402 may send a PC5 authentication request message to first WTRU 404 (ref.422). The PC5 authentication request message may include second WTRU 406's authentication container, first WTRU 404 user information, second WTRU 406 user information, an E2E authentication indication, or any appropriate combination thereof. First WTRU 404 may validate the second WTRU authentication container, and may send (e.g., reply with) a PC5 authentication response message including any of: second WTRU 406 user information, first WTRU 404 user information, an E2E authentication indication, and in a case where the authentication procedure is completed, an "authentication complete" indication, or any appropriate combination thereof (ref. 424).

Relay WTRU 402 may store (e.g., keep track of) an indication (e.g., a record) of successful authentication between first WTRU 404 user information and second WTRU 406 user information (ref. 420). In an example embodiment in which an authentication complete indication is received from both WTRU 404 and WTRU 406 (ref. 426), relay WTRU 402 may reply to the DNS query message by sending a DNS response message including second WTRU 406's IP address (ref. 428). If WTRU 404, WTRU 406, or both, send a PC5 authentication reject message, relay WTRU 402 may not reply to the DNS query, and/or relay WTRU 402 may send a DNS Reject message.

Figure 5:
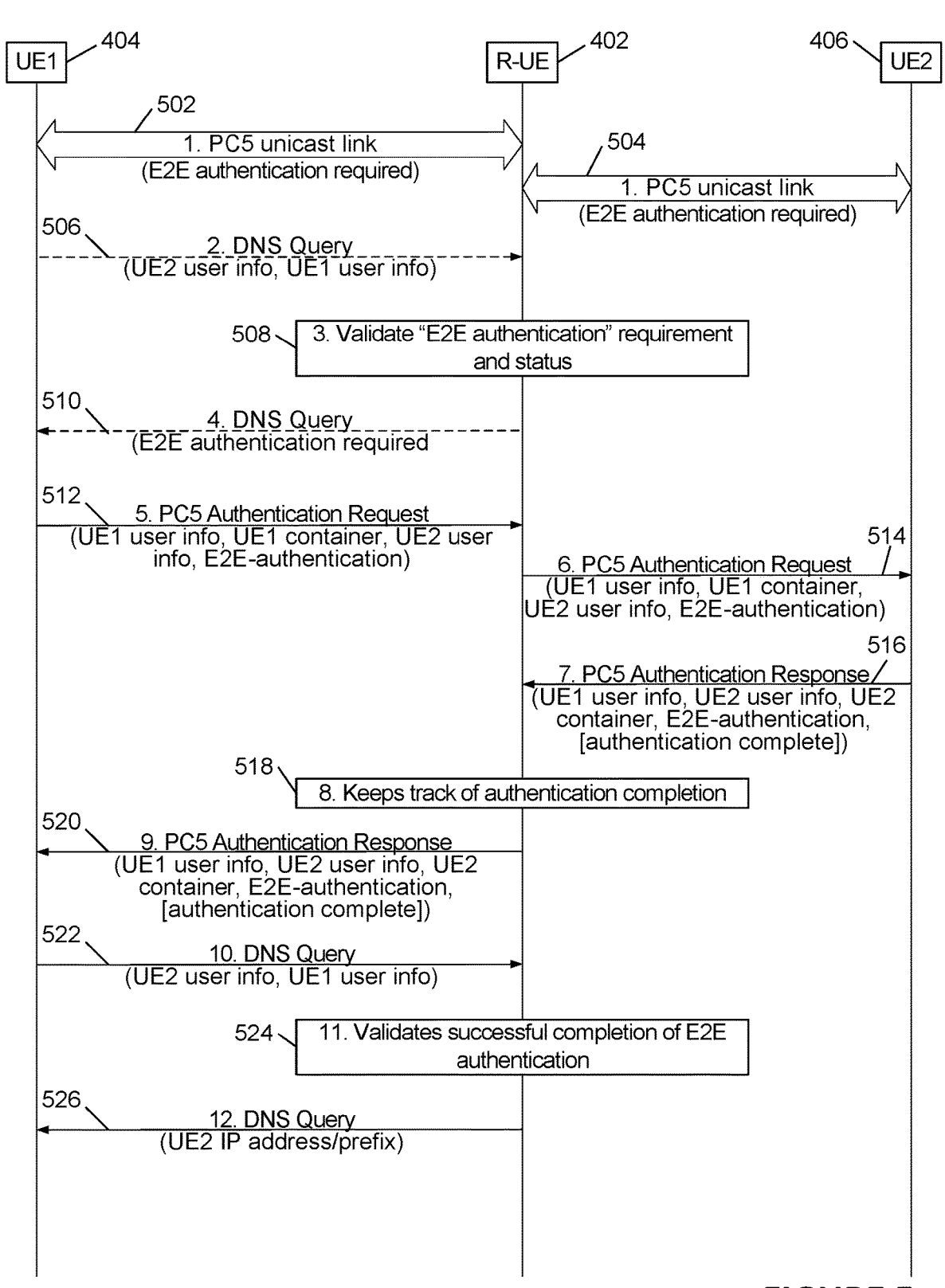
FIG. 5 is a diagram illustrating end-to-end authentication with an L3 WTRU-to-WTRU relay and IP traffic with a DNS reject with E2E authentication required cause, according to embodiments.

A WTRU may be configured to authenticate E2E traffic utilizing a reject message. FIG. 5 is an example diagram illustrating end-to-end authentication with a WTRU relay and IP traffic with a DNS reject with E2E authentication. Operations depicted in FIG. 5 may be similar to operations depicted in FIG. 4, For example, refs. 502, 504, and 506 of FIG. 5 may be similar to refs. 408, 410, and 412 of FIG. 4, respectively.

As depicted in FIG. 5, relay WTRU 402 may verify the E2E authentication policy associated with second (e.g., target) WTRU 406 user information and first WTRU 404 user information (ref. 508). In an example embodiment in which E2E authentication is required for one of the WTRU 404 or WTRU 406, relay WTRU 402 may send a DNS reject message including an E2E authentication required reason, to first WTRU 404 (ref. 510). First WTRU 404 may receive the DNS reject message, and because there is an indication that E2E authentication is required, first WTRU 404 may trigger E2E authentication with second WTRU 406. First WTRU 404 may send a PC5 authentication request message, to relay WTRU 402 (ref.512). The PC5 authentication request message may include first WTRU 404's authentication container, first WTRU 404 user information, second WTRU 406 user information, an E2E authentication indication, or any appropriate combination thereof. If first WTRU 404 decides E2E authentication is required (e.g., first WTRU 404 specifies at ref. 502 that E2E authentication is required prior to E2E communication), first WTRU 404 may send a PC5 authentication request message (ref. 512), for example, immediately after ref. 502, and refs. 506, 508, and 510 may be skipped.

Relay WTRU 402 may receive the PC5 authentication request message, and because the E2E authentication indication is included, relay WTRU 402 may send a PC5 authentication request message to second WTRU 406 (e.g., based on the second WTRU user information included in the request message) (ref. 514). The PC5 authentication request message may include first WTRU 404's authentication container, first WTRU 404 user information, second WTRU 406 user information, an E2E authentication indication, or any appropriate combination thereof. Refs. 516 and 518 of FIG. 5 may be similar to refs. 418 and 420 of FIG. 4, respectively.

Relay WTRU 402 may send a PC5 authentication response message to first WTRU 404 (ref. 520). The PC5 authentication response message may include second WTRU 406's authentication container, first WTRU 404 user information, second WTRU 406 user information, an E2E authentication indication, and, in a case where an authentication complete indication has been received from second WTRU 406, an authentication complete indication, or any appropriate combination thereof.

First WTRU 404 may validate second WTRU 406's authentication container, and in a case where validation is successful, first WTRU may send a DNS query message again (e.g., similar to ref. 506) (ref. 522). Relay WTRU 402 may interpret the reception of the DNS query from first WTRU 404 as an indication that authentication is successfully completed and, relay WTRU 402 may keep track of authentication completion from first WTRU 404. Relay WTRU 402 may validate that E2E authentication is completed and successful (ref. 524). Relay WTRU 402 may send a DNS response message including second WTRU 406's IP address, for example, based on successful authentication completion (ref. 526).

Figure 6:
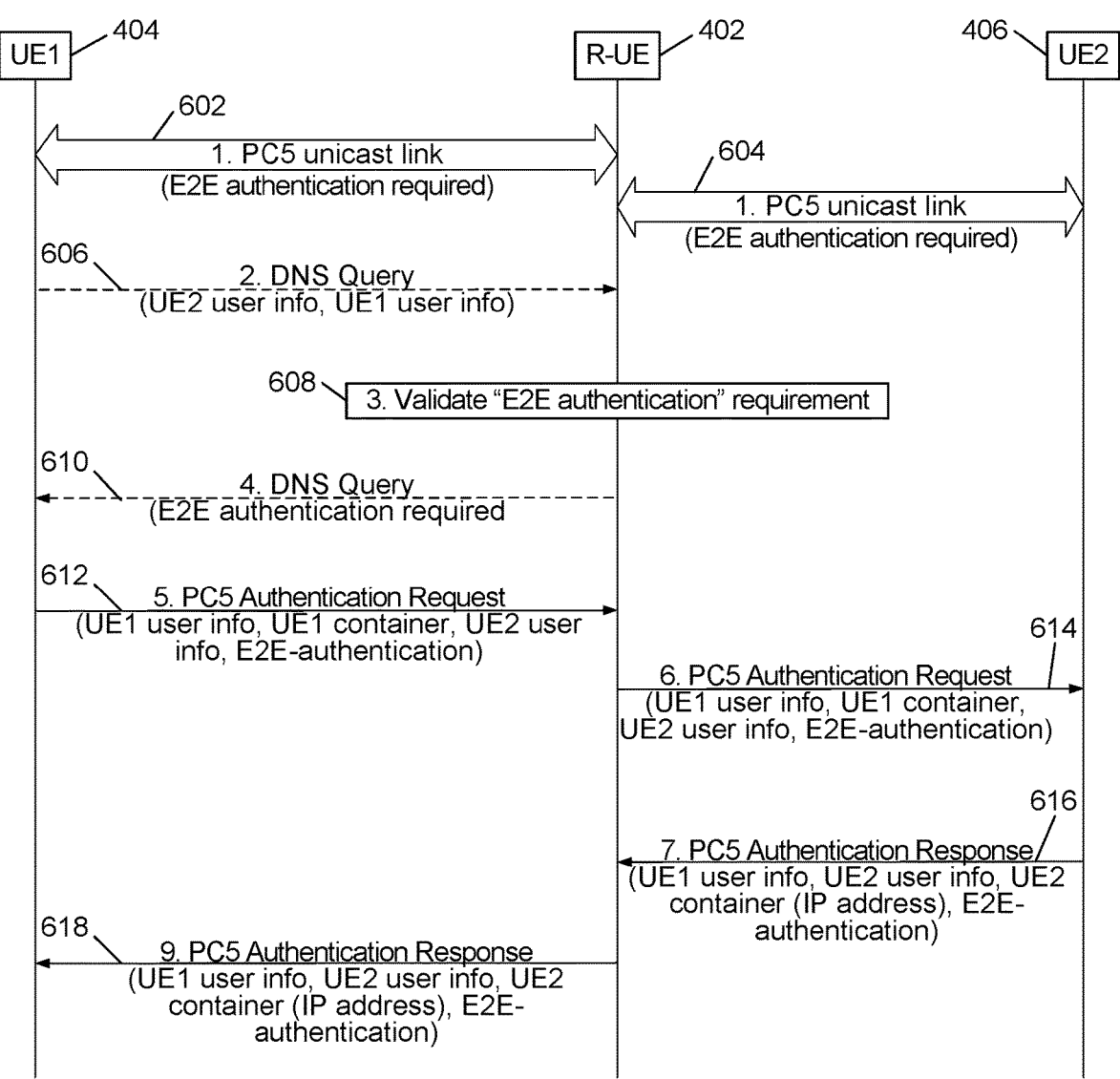
FIG. 6 is a diagram illustrating an end-to-end authentication without a tracking authentication procedure by a WTRU-to-WTRU relay, according to embodiments.

E2E authentication may be accomplished without a relay WTRU tracking the authentication. FIG. 6 is an example diagram illustrating an end-to-end authentication without a tracking authentication procedure by a WTRU-to-WTRU relay, Refs. 602, 604, 606, 608, 610, 612, and 614 of FIG. 6 may be similar to refs. 502, 504, 506, 508, 510, 512, and 514, respectively of FIG. 5. Ref. 616 of FIG. 6 may be similar to ref. 516 of FIG. 5, however, second WTRU 406 may include its IP address in second WTRU 406's authentication container at ref. 616. As depicted in FIG. 6, relay WTRU 402 may not track the E2E authentication status between the WTRU 404 and WTRU 406. Ref. 618 of FIG. 6 may be similar to ref. 518 of FIG. 5, however, second WTRU 406's IP address may be forwarded to first WTRU 404 in second WTRU 406's authentication container at ref. 618.

Figure 7:
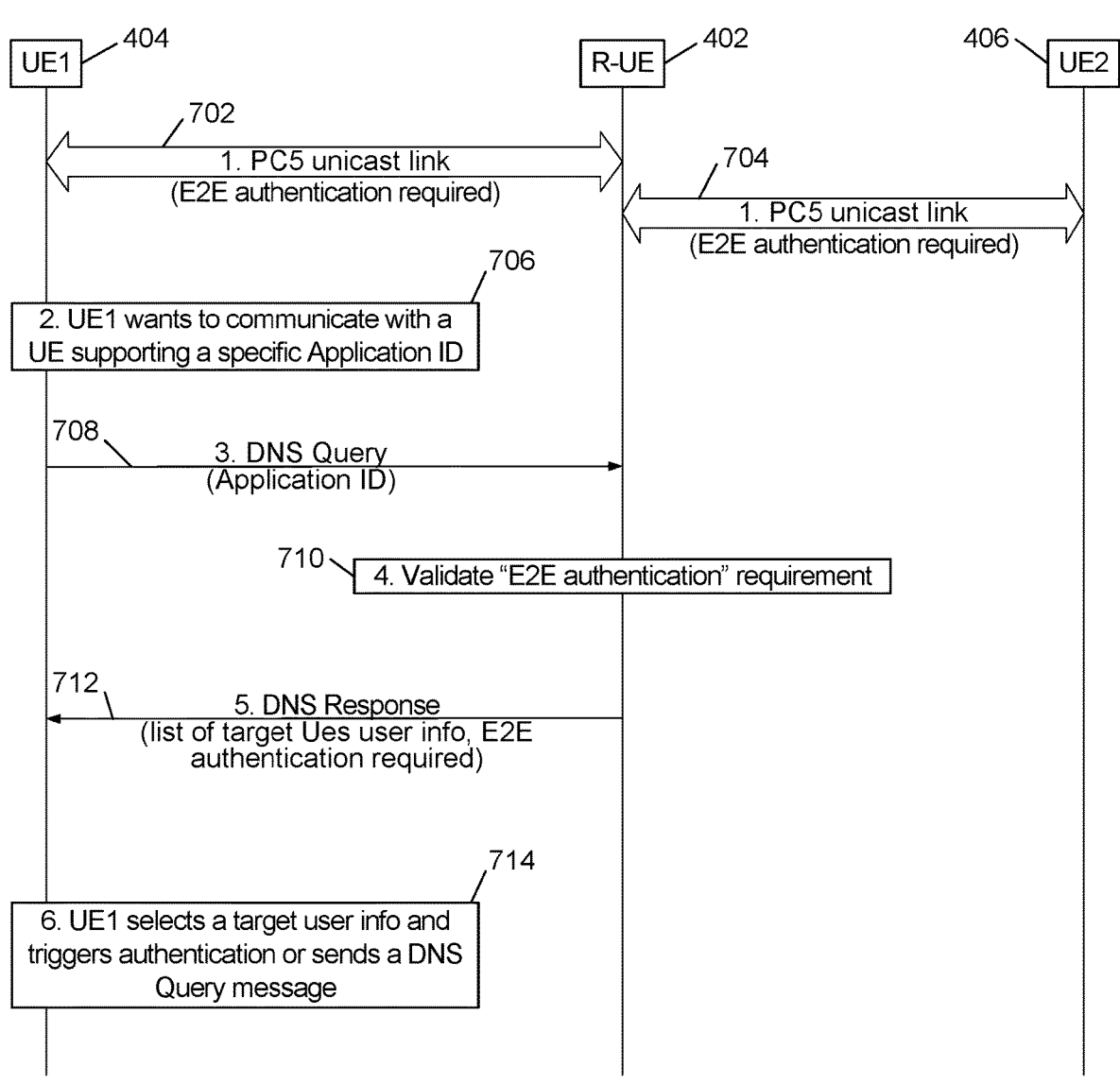
FIG. 7 is a diagram illustrating end-to-end authentication with an L3 WTRU-to-WTRU relay and IP traffic, involving a DNS query with an application ID, according to embodiments.

E2E authentication may be accomplished based on a DNS query comprising an application identifier (ID). FIG. 7 is an example diagram illustrating end-to-end authentication with a WTRU relay and IP traffic, involving a DNS query with an application ID. As an overview: first WTRU 404 may send a DNS query indicating (e.g., identifying, specifying, etc.) an application ID (e.g., instead of the second/target WTRU user information). In such a case, the DNS response may include a list of IP addresses and/or prefixes of target WTRUs that support the (e.g., indicated) application ID. If E2E authentication is required, E2E authentication may be accomplished as described below.

Refs. 702 and 704 of FIG. 7 may be similar to refs. 602 and 605 of FIG. 6, respectively. First WTRU 404 may determine (e.g., select, want, be required, etc.) to communicate with another (e.g., a second, a target, etc.) WTRU that supports an (e.g., specific, certain) application, which may be indicated by an application ID (ref. 706). First WTRU 404 may send a DNS query message to relay WTRU 402 (ref. 708). The DNS query message may include the (e.g., specific) application ID. Relay WTRU 402 may verify the E2E authentication policy associated with the (e.g., specified) application ID (ref. 710). If E2E authentication is required, relay WTRU 402 may send a DNS response message including a list of target WTRUs' user information and information indicating the E2E authentication required (ref. 712). First WTRU 404 may select a target user information from the received list and may continue the E2E authentication procedure in a manner as discussed above (ref. 714).

Figure 8:
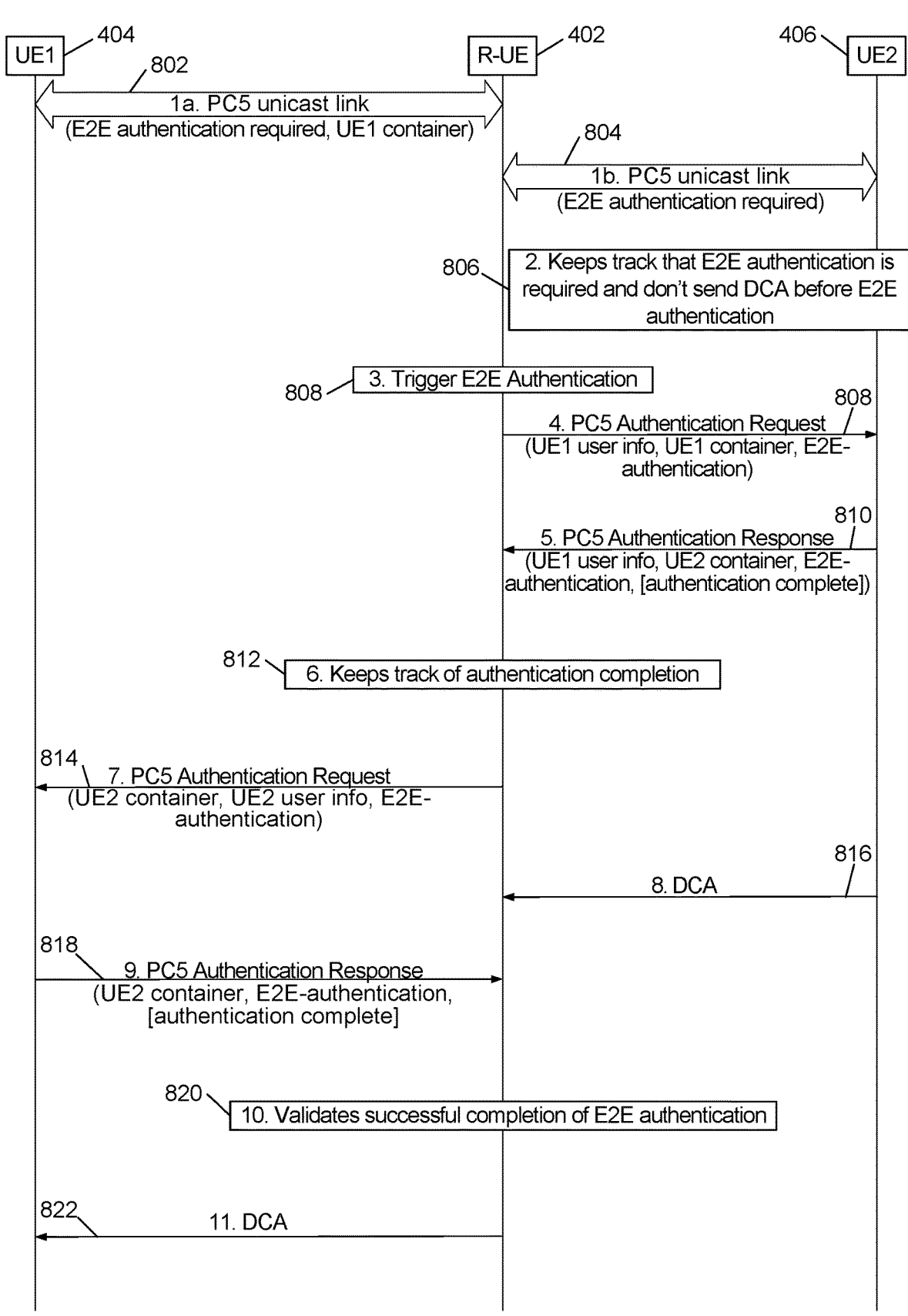
FIG. 8 is a diagram illustrating end-to-end authentication with an L3 WTRU-to-WTRU relay and non-IP traffic, according to embodiments.

A relay WTRU may be configured to authenticate non-IP traffic. FIG. 8 is an example diagram illustrating end-to-end authentication with a WTRU relay and non-IP traffic. As discussed above, and depicted in FIG. 8, E2E authentication may be accomplished using a relay WTRU when non-IP traffic is used. For example, PC5 links may be established for non-IP traffic between first WTRU 404 and relay WTRU 402, and between the relay WTRU 402 and second WTRU 406 (refs. 802, 804). During PC5 link establishment, first WTRU 40 may specify that E2E authentication is required prior to E2E communication, or in other words, that E2E authentication needs to be executed successfully before allowing traffic to be exchanged between E2E peers. First WTRU 404 also may specify (e.g., indicate) its first WTRU 404 authentication container. Relay WTRU 402 may save this E2E authentication requirement associated with first WTRU 404 user information and application ID with first WTRU 404 authentication container. During the link establishment between relay WTRU 402 and second WTRU 406, relay WTRU 402 may specify that E2E authentication is required prior to E2E communication.

Second WTRU 406 may store (e.g., keep track of) the fact that E2E authentication is required and that a direct communication accept (DCA) message cannot be sent before successfully completing E2E authentication (ref. 806). In an example embodiment in which PC5 link establishment is almost completed between relay WTRU 402 and first WTRU 404 and between relay WTRU 402 and second WTRU 406 (e.g., after PC5 unicast link security establishment and before sending a DCA message), relay WTRU 402 may trigger an E2E authentication procedure (ref. 808). Relay WTRU 402 may send a PC5 authentication request message to second WTRU 406 (ref. 808). The PC5 authentication request message may include the first WTRU 404 authentication container, first WTRU 404 user information, second WTRU 406 user information, an E2E authentication indication, or any appropriate combination thereof. Second WTRU 406 may validate the first WTRU 404 authentication container, and second WTRU 406 may send (e.g., reply with) a PC5 authentication response message (ref. 810). The PC5 authentication response message may include the second WTRU 406 authentication container, second WTRU 406 user information, first WTRU 404 user information, information indicating E2E authentication, an authentication complete indication in a case where the authentication procedure is completed, or any appropriate combination thereof.

Relay WTRU 402 may store (e.g., keep track of) information indicating the authentication completion, for example, based on the received authentication completion indication (ref. 812). Relay WTRU 402 may send a PC5 authentication request message to first WTRU 404 (ref. 814). The PC5 authentication request message may include the second WTRU 406 authentication container, first WTRU 404 user info, second WTRU 406 user information, an E2E authentication indication, or any appropriate combination thereof. Second WTRU 406 may send a DCA message, for example, to complete the PC5 link establishment procedure (ref. 816). Relay WTRU 402 may wait for successful E2E authentication procedure completion before sending a DCA message to first WTRU 404.

First WTRU 404 may validate the second WTRU 406 authentication container and may send (e.g., reply with) a PC5 authentication response message (ref. 818). The PC5 authentication response message may include second WTRU 406 user information, first WTRU 404 user information, an E2E authentication indication, an authentication complete indication if the authentication procedure is completed, or any appropriate combination thereof. Relay WTRU 402 may validate successful completion of the E2E authentication and store (e.g., keep track of) successful authentication completion for first WTRU 404 user information and second WTRU 406 user information (ref. 820). If an authentication complete indication is received from first WTRU 404 and second WTRU 406, relay WTRU 402 may send a DCA message to first WTRU 404 (ref. 822).

In various example embodiments, relay WTRU 402 may send a direct communication request (DCR) message to second WTRU 406. The DCR message may include first WTRU 404 user information, the first WTRU 404 authentication container, information indicating that E2E authentication is required, second WTRU 406 user information, or any appropriate combination thereof. Second WTRU 406 may trigger E2E authentication (e.g., before sending a DCA message) based on information received via DCR messages. Second WTRU 406 may validate the first WTRU 404 authentication container, and may send a PC5 authentication request message including its (e.g., second WTRU 406's) authentication container, the second WTRU user information, the first WTRU user information, an E2E authentication indication, or any appropriate combination thereof. Subsequently, relay WTRU 402 may send a PC5 authentication request message to first WTRU 404.

In various example embodiments, first WTRU 404 may validate second WTRU 406's authentication container and first WTRU 404 may send (e.g., reply with) a PC5 authentication response message including information indicating an E2E authentication indication, an E2E authentication complete indication, for example, in a case where no more authentication messages need to be exchanged, or any appropriate combination thereof. Relay WTRU 402 may send a PC5 authentication response message to second WTRU 406. The PC5 authentication response message may include information indicating E2E authentication completion. Second WTRU 406 may send a DCA to relay WTRU 402, and relay WTRU 402 then may a DCA message to first WTRU 404. If E2E authentication fails, any of first WTRU 404, second WTRU 406, and relay WTRU 402, may send a Direct Communication Reject message, for example, in order to abort the link establishment procedure.

Figure 9:
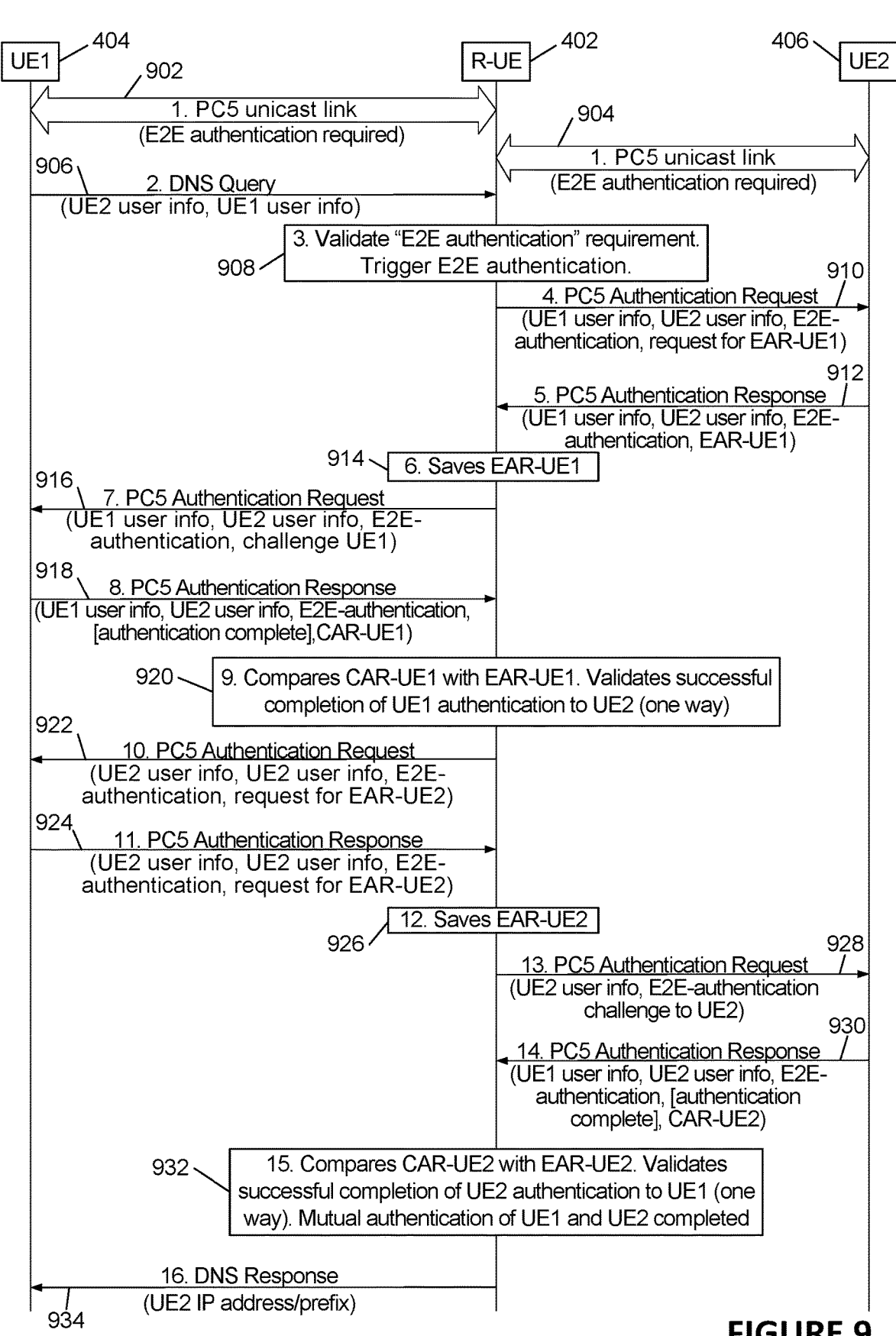
FIG. 9 is a diagram illustrating end-to-end authentication with an L3 WTRU-to-WTRU relay acting as an authenticator, according to embodiments.

A WTRU may be configured to authenticate E2E traffic. FIG. 9 is an example diagram illustrating end-to-end authentication utilizing a WTRU relay as an authenticator. A relay WTRU may act as an authenticator, for example, on behalf of any of first and second WTRUs (e.g., on behalf of UE2 and on behalf of UE1), for example, when mutually authenticating peer WTRUs. When a relay WTRU acts as an authenticator, pre-established bilateral trust may be utilized between the relay WTRU and the first WTRU and between the relay WTRU and the second WTRU. However, trust between the first WTRU and the second WTRU may not be required.

Referring to FIG. 9, PC5 unicast links may be established between first WTRU 404 and relay WTRU 402, and between second WTRU 406 and relay WTRU 402 (refs. 9-2, 904). During PC5 link establishment, any of first WTRU 404 or second WTRU 406 may indicate (e.g., specify) that E2E authentication is required prior to E2E communication between first WTRU 404 and second WTRU 406, or in other words, that IP address(es) cannot be shared before E2E authentication is successful. First WTRU 404 may send a DNS query message to relay WTRU 402 (ref. 906). The DNS query message may include second WTRU 406 user information, first WTRU 404 user information, a request for the IP address of second WTRU 406, or any appropriate combination thereof. Relay WTRU 402 may verify that E2E authentication is required in order to obtain second WTRU 406's IP address (ref. 908). If E2E authentication is required, relay WTRU 402 may trigger an E2E authentication (ref. 908).

Relay WTRU 402 may send a PC5 authentication request message to second WTRU 406 (ref. 910). The PC5 authentication request message may include first WTRU 404 user information, second WTRU 406 user information, a request for Expected Authentication Response (EAR) from first WTRU 404 (a request for EAR-UE1), or any appropriate combination thereof. Second WTRU 406 may reply with an EAR from first WTRU 404 (EAR-UE1) (ref. 912). Relay WTRU 402 may store (e.g., keep) any of the received EAR-UE1 associated with the first WTRU user information and the second WTRU user information (ref. 914). Relay WTRU 402 may send a challenge to first WTRU 404 (e.g., a parameter indicating a challenge to first WTRU 404) (ref. 916).

First WTRU 404 may send (e.g., reply with) a PC5 authentication response message including a computed authentication response (CAR) from first WTRU 404 (e.g., CAR-UE1), first WTRU 404 user information, second WTRU 406 user information, an E2E authentication indication, and, optionally, an authentication complete indication, or any appropriate combination thereof (ref. 918). Relay WTRU 402 may compare the received CAR-UE1 with the stored EAR-UE1 (e.g., received at ref. 912 and saved at ref. 914) and, upon matching, relay WTRU 402 may determine that authentication of first WTRU 404 to second WTRU 406 as being successful.

According to embodiments, as a tenth operation, the relay WTRU may send a PC5 authentication request message to the first WTRU, the request message including the first WTRU user information, the second WTRU user information, and a request for EAR from the second WTRU (e.g., request for EAR-UE2). According to embodiments, the tenth operation may be combined with (e.g., performed at the same time as) the seventh operation, for example, for efficiency. According to embodiments, as an eleventh operation, the first WTRU may send (e.g., reply with) the EAR from the second WTRU (e.g., EAR-UE2). Note that this step may be combined with the eighth operation for efficiency. According to embodiments, the eleventh operation may be combined with (e.g., performed at the same time as) the eighth operation, for example, for efficiency. According to embodiments, as a twelfth operation, the relay WTRU may save (e.g., store) the EAR-UE2 received from the first WTRU. According to embodiments, as a thirteenth operation, the relay WTRU may send a challenge to the second WTRU (UE2) parameter to the second WTRU.

According to embodiments, as a fourteenth operation, the second WTRU may perform (e.g., its) authentication functionality (e.g., based on a shared secret) and may send (e.g., responds with) a CAR-UE2 in a PC5 authentication response message including information indicating authentication completion. According to embodiments, as a fifteenth operation, the relay WTRU may compare the received CAR-UE2 with the stored EAR-UE2 (e.g., from the eleventh operation) and, upon matching, the relay WTRU may determine (e.g., deem) authentication of the second WTRU to the first WTRU successful. According to embodiments, taken together with the successful ninth operation, the successful fifteenth operation may signify a successful mutual authentication between the first WTRU and the second WTRU. According to embodiments, as a sixteenth operation, the relay WTRU may reply to the first WTRU's DNS query message by sending a DNS response message including the second WTRU's IP address, for example, in a case where the mutual authentication between the first WTRU and the second WTRU is successful based on an authentication complete indication.

According to embodiments, the first WTRU may not (e.g., cannot) communicate with the second WTRU without knowing the second WTRU IP address. Accordingly, according to embodiments, in a case of (e.g., by, because of, etc.) blocking (e.g., suspending, holding, restricting, etc.) a DNS response message to the first WTRU, the relay WTRU may enforce the policy of requiring mutual authentication before communication. According to embodiments, embodiments (e.g., procedures, operations, features, methods, etc.) discussed above may be applied to non-IP traffic, similar to those as discussed above. According to embodiments, in such a case, the PC5 link establishment for non-IP traffic may be the trigger to send the request for the EAR and the challenge. According to embodiments, in a case where (e.g., upon) the mutual authentication is successfully completed, the relay WTRU may complete the link establishment with the first WTRU and the second WTRU, wherein the second and sixteenth operation are not performed.

The following is incorporated by reference herein: 3GPP TR 23.752 v1.1.0. Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods, apparatuses, and articles of manufacture, within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

Although foregoing embodiments may be discussed, for simplicity, with regard to specific terminology and structure, (e.g., radio frequency (RF), microwave, centimeter wave, micrometer wave, infrared (IR), ultraviolet (UV), visible light, etc.), the embodiments discussed, however, are not limited to thereto, and may be applied to other systems that use other forms of electromagnetic waves or non-electromagnetic waves such as acoustic waves, for example.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis, or the like, or any appropriate combination thereof. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU): (ii) any of a number of embodiments of a WTRU: (iii) a wireless-capable and/or wired-capable (e.g., tetherable) device configured with, inter alia, some or all structures and functionality of a WTRU: (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media, which are differentiated from signals, include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of methods, apparatuses, articles of manufacture, and systems provided above are possible without departing from the scope of the invention. In view of the wide variety of embodiments that can be applied, it should be understood that the illustrated embodiments are examples only, and should not be taken as limiting the scope of the following claims. For instance, embodiments provided herein include handheld devices, which may include or be utilized with any appropriate voltage source, such as a battery or the like, providing any appropriate voltage.

Moreover, in embodiments provided herein, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In example embodiments, several portions of the subject matter described herein may be implemented via Application Specific Integrated Circuits (ASICs), Field Programmable Gate Arrays (FPGAs), digital signal processors (DSPs), and/or other integrated formats. Those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. Those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A relay wireless transmit receive unit (WTRU) comprising:

a transceiver; and a processor configured to:

establish a first PC5 unicast link with a first WTRU and a second PC5 unicast link with a second WTRU;

receive, via the transceiver, a first domain name system (DNS) query from the first WTRU via the first PC5 unicast link, the first DNS query requesting an internet protocol (IP) address of the second WTRU, the first DNS query comprising an authentication container for the first WTRU;

send, via the transceiver, a first authentication request to the second WTRU via the second PC5 unicast link, the first authentication request comprising the authentication container for the first WTRU;

receive, via the transceiver, a first authentication response from the second WTRU via the second PC5 unicast link, the first authentication response indicating successful authentication of the first WTRU by the second WTRU and an authentication container for the second WTRU;

send, via the transceiver, a second authentication request to the first WTRU via the first PC5 unicast link, the second authentication request comprising the authentication container for the second WTRU;

receive, via the transceiver, a second authentication response from the first WTRU via the first PC5 unicast link, the second authentication response indicating successful authentication of the second WTRU by the first WTRU; and send, via the transceiver, a DNS response comprising the IP address of the second WTRU to the first WTRU via the first PC5 unicast link based on the successful authentication of the first WTRU by the second WTRU, and the successful authentication of the second WTRU by the first WTRU.

2. The relay WTRU of claim 1, the processor further configured to:

receive, via the transceiver, a second DNS query comprising an application identifier (ID) from the first WTRU via the first PC5 unicast link, wherein the second DNS query is received prior to receipt of the first DNS query;

send, via the transceiver, a list of application layer IDs of respective WTRUs that support the application ID to the first WTRU via the first PC5 unicast link; and subsequent to sending the list of application layer IDs, receive, via the transceiver, the first DNS query requesting the IP address of the second WTRU from the first WTRU via the first PC5 unicast link, wherein the IP address of the second WTRU was determined from the list of application layer IDs.

3. The relay WTRU of claim 1, the processor further configured to store at least one of:

an indication that the first WTRU is authorized to communicate with the second WTRU; or an indication that the second WTRU is authorized to communicate with the first WTRU.

4. The relay WTRU of claim 1, the processor further configured to:

receive, via the transceiver, a second DNS query requesting an internet protocol (IP) address of the second WTRU from the first WTRU via the first PC5 unicast link, wherein the second DNS query is received prior to receipt of the first DNS query;

send, via the transceiver, a reject message to the first WTRU via the first PC5 unicast link, the reject message indicating that authorization is needed to obtain the IP address of the second WTRU; and subsequent to sending the reject message, receive, via the transceiver, the first DNS query comprising the authentication container for the first WTRU from the first WTRU via the first PC5 unicast link.

5. The relay WTRU of claim 4, the processor further configured to determine that authorization is needed based on an authentication policy associated with the first WTRU and the second WTRU.

6. A method comprising:

establishing a first PC5 unicast link between a relay wireless transmit receive unit (WTRU) and a first WTRU and a second PC5 unicast link between the relay WTRU and a second WTRU;

receiving a first domain name system (DNS) query requesting an internet protocol (IP) address of the second WTRU, the first DNS query comprising an authentication container for the first WTRU via the first PC5 unicast link;

sending a first authentication request to the second WTRU via the second PC5 unicast link, the first authentication request comprising the authentication container for the first WTRU;

receiving a first authentication response from the second WTRU via the second PC5 unicast link, the first authentication response indicating successful authentication of the first WTRU by the second WTRU and an authentication container for the second WTRU;

sending a second authentication request to the first WTRU via the first PC5 unicast link, the second authentication request comprising the authentication container for the second WTRU;

receiving a second authentication response from the first WTRU via the first PC5 unicast link, the second authentication response indicating successful authentication of the second WTRU by the first WTRU; and sending a DNS response comprising the IP address of the second WTRU to the first WTRU via the first PC5 unicast link based on the successful authentication of the first WTRU by the second WTRU, and the successful authentication of the second WTRU by the first WTRU.

7. The method of claim 6, further comprising:

receiving a second DNS query comprising an application identifier (ID) from the first WTRU via the first PC5 unicast link, wherein the second DNS query is received prior to receipt of the first DNS query;

sending a list of application layer IDs of respective WTRUs that support the application ID to the first WTRU via the first PC5 unicast link;

subsequent to sending the list of application layer IDs, receiving the first DNS query requesting the IP address of the second WTRU from the first WTRU via the first PC5 unicast link, wherein the IP address of the second WTRU was determined from the list of application layer IDs.

8. The method of claim 6, further comprising storing at least one of:

an indication that the first WTRU is authorized to communicate with the second WTRU; or an indication that the second WTRU is authorized to communicate with the first WTRU.

9. The method of claim 6, further comprising:

receiving a second DNS query requesting an internet protocol (IP) address of the second WTRU from the first WTRU via the first PC5 unicast link, wherein the second DNS query is received prior to receipt of the first DNS query;

sending a reject message to the first WTRU via the first PC5 unicast link, the reject message indicating that authorization is needed to obtain the IP address of the second WTRU; and subsequent to sending the reject message, receiving the first DNS query comprising the authentication container for the first WTRU from the first WTRU via the first PC5 unicast link.

10. The method of claim 9 further comprising determining that authorization is needed based on an authentication policy associated with the first WTRU and the second WTRU.

* * * * *